(12) United States Patent
Rupert et al.

(10) Patent No.: US 6,910,684 B2
(45) Date of Patent: Jun. 28, 2005

(54) FIXTURE BOLT ASSEMBLY

(75) Inventors: Charles Rupert, Portage, MI (US); Drew Deters, Portage, MI (US)

(73) Assignee: Mann & Hummel GmbH, Ludwigsburg (DE)

( * ) Notice: Subject to any disclaimer, the term of this patent is extended or adjusted under 35 U.S.C. 154(b) by 91 days.

(21) Appl. No.: 10/388,163

(22) Filed: Mar. 14, 2003

(65) Prior Publication Data

US 2004/0018050 A1 Jan. 29, 2004

Related U.S. Application Data

(60) Provisional application No. 60/364,144, filed on Mar. 15, 2002.

(51) Int. Cl.[7] ............................................... B23Q 1/00
(52) U.S. Cl. ...................... 269/47; 269/48.1; 269/54.1
(58) Field of Search ..................... 269/47, 48.1, 54.1, 269/95; 29/255, 278, 263

(56) References Cited

U.S. PATENT DOCUMENTS

| | | | | |
|---|---|---|---|---|
| 1,720,428 A | * | 7/1929 | Naggy et al. ................ | 29/266 |
| 5,233,741 A | * | 8/1993 | Maynard ...................... | 29/266 |
| 5,937,495 A | * | 8/1999 | Kuo ............................. | 29/256 |
| 6,122,810 A | * | 9/2000 | McInnes ...................... | 29/264 |
| 6,266,859 B1 | * | 7/2001 | Hernandez ................... | 29/256 |

* cited by examiner

*Primary Examiner*—Lee D. Wilson
(74) *Attorney, Agent, or Firm*—Crowell & Moring LLP

(57) ABSTRACT

In an embodiment of the present invention, a fixture bolt assembly is disclosed. The fixture bolt assembly includes a fixture housing that defines a bore therethrough and a cavity. A securement member is disposed through the bore and the cavity. A retaining member is disposed on the securement member and within the cavity of the fixture housing. In an embodiment for a method in accordance with the present invention, a method of mounting a securement member on a fixture housing is disclosed. The method includes the steps of disposing the securement member through a bore and cavity defined by the fixture housing. A retaining member is disposed on the securement member within the cavity of the fixture housing.

15 Claims, 3 Drawing Sheets

FIXTURE BOLT ASSEMBLY

BACKGROUND OF THE INVENTION

In a manufacturing process, it is required to attach a product specific fixture to a common machine plate for performing a manufacturing operation on a product secured in the fixture. For example, the manufacturing process could include joining two halves of a bottle by welding the two halves together. In this exemplary process, the upper half of the bottle is placed in an upper fixture and the lower half of the bottle is placed in a lower fixture for the welding procedure. To maintain the positioning of the fixtures and to hold the fixtures, the upper and lower fixtures are secured to upper and lower machine plates, respectively.

In order to secure the fixtures to the machine plates, securement members, such as toe clamps or bolts, can be used. The toe clamps clamp the fixtures to the machine plates and the bolts extend through the fixtures and into the machine plates where they can be threaded into the machine plates.

There are problems associated with using toe clamps or bolts in the manufacturing process to secure a fixture to a machine plate. Toe clamps are bulky and difficult to handle. A representative toe clamp is comprised of four independent pieces that must be organized and assembled by a technician. Additionally, in a representative manufacturing process, four toe clamp assemblies must be used per fixture to clamp the fixture to the machine plate.

There are also problems associated with using bolts to secure the fixtures to the machine plates. If bolts are used, certain types of fixtures may require a large quantity of such bolts in order to secure the fixture to the machine plate. Inefficiencies in the manufacturing process can result from requiring an operator to first locate a sufficient quantity of appropriately sized bolts and then having to install each of the bolts in the fixture for ultimate mating with the machine plate. This can be a time and labor intensive process, which in a manufacturing process, is classified as a non-value added activity.

Additionally, if a different fixture is required to be installed on the machine plate, all of the bolts must be removed from the first fixture and then reinstalled into the new fixture for securing the new fixture to the machine plate. Again, this time and labor intensive process adds inefficiencies to the overall manufacturing process.

Therefore, it would be desirable to provide an improved apparatus and method for securing a fixture to a machine plate. The improved apparatus and method would reduce the number of process steps required for attaching a fixture to a machine plate. Consequently, the time required for the overall manufacturing process would also be reduced.

SUMMARY OF THE INVENTION

In an embodiment of the present invention, a fixture bolt assembly is provided. The fixture bolt assembly includes a fixture housing that defines a bore therethrough and a cavity. A securement member is disposed through the bore and the cavity. The securement member has a head on a first end of the securement member where the head is disposed on a top side of the fixture housing. A retaining member is disposed on a second end of the securement member and within the cavity of the fixture housing, where the cavity is disposed on an underside of the fixture housing.

In an embodiment for a method in accordance with the present invention, a method of mounting a securement member on a fixture housing is provided. The method includes the steps of disposing the securement member through a bore and cavity defined by the fixture housing such that a head disposed on a first end of the securement member is positioned on a top side of the fixture housing. The method also includes the step of coupling a retaining member on a second end of the securement member where the retaining member is disposed within the cavity on an underside of the fixture housing.

BRIEF DESCRIPTION OF THE DRAWINGS

The various features of the invention will best be appreciated by simultaneous reference to the description which follows and the accompanying drawings.

DETAILED DESCRIPTION OF THE DRAWINGS

Figure 1:
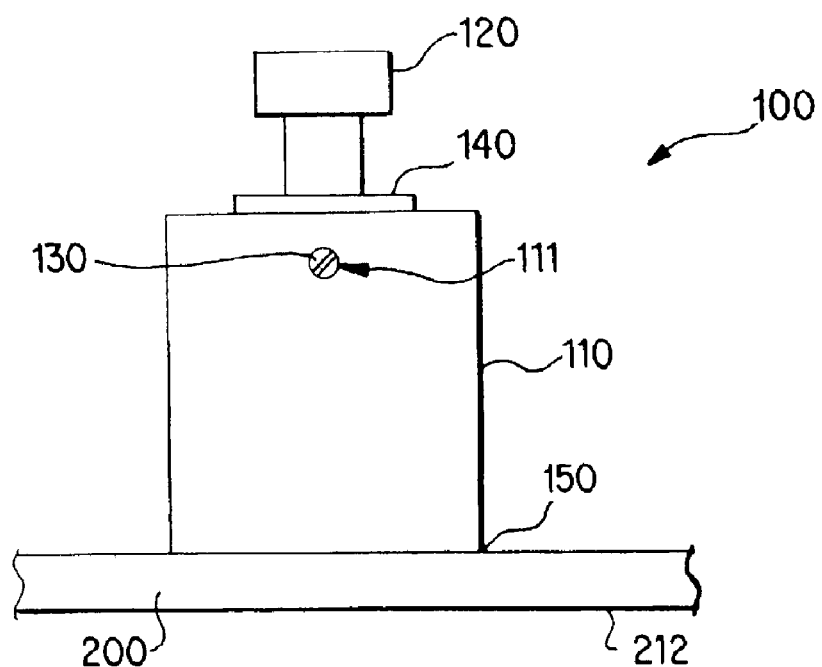
FIG. 1 is a side view of an embodiment of a fixture bolt assembly in accordance with the principles of the present invention mounted to a fixture base with the securement member in a retracted first position.

FIG. 1 illustrates an embodiment for a fixture bolt assembly 100 in accordance with the principles of the present invention. As can be seen in FIG. 1, fixture bolt assembly 100 is secured to a fixture base 200. Fixture bolt assembly 100 can be secured to fixture base 200 by any of a variety of methods, depending upon the materials from which fixture bolt assembly 100 and fixture base 200 are comprised. In the embodiment of FIG. 1, fixture bolt assembly 100 is secured to fixture base 200 through a weld 150.

As will also be further described later in this specification, fixture bolt assembly 100 includes a fixture housing 110, a securement member 120, a positioning member 130, and a washer 140. In an embodiment, securement member 120 may be comprised of a bolt with threading on at least a lower-most end thereof. Positioning member 130 extends through an aperture 111 defined by fixture housing 110. As will be further explained later in this specification, positioning member 130 engages with the shank portion of securement member 120 in order to retain securement member 120 in a first position where the lower-most end of securement member 120 does not extend beyond the lower-most surface 212 of fixture base 200. As will also be explained further later in this specification, positioning member 130 includes external threading thereon such that it may be threaded into aperture 111 of fixture housing 110.

FIG. 1 illustrates securement member 120 in the first position, as described previously above, where the lower-most end of securement member 120 does not extend beyond the lower-most surface 212 of fixture base 200. In this first position for securement member 120, fixture base 200, and consequently fixture bolt assembly 100, may be aligned with a machine plate without having the lower-most end of securement member 120 hinder the alignment process between fixture base 200 and the machine plate. As was also described previously, positioning member 130 engages the shank portion of securement member 120 in order to retain securement member 120 in this first position.

Figure 2:
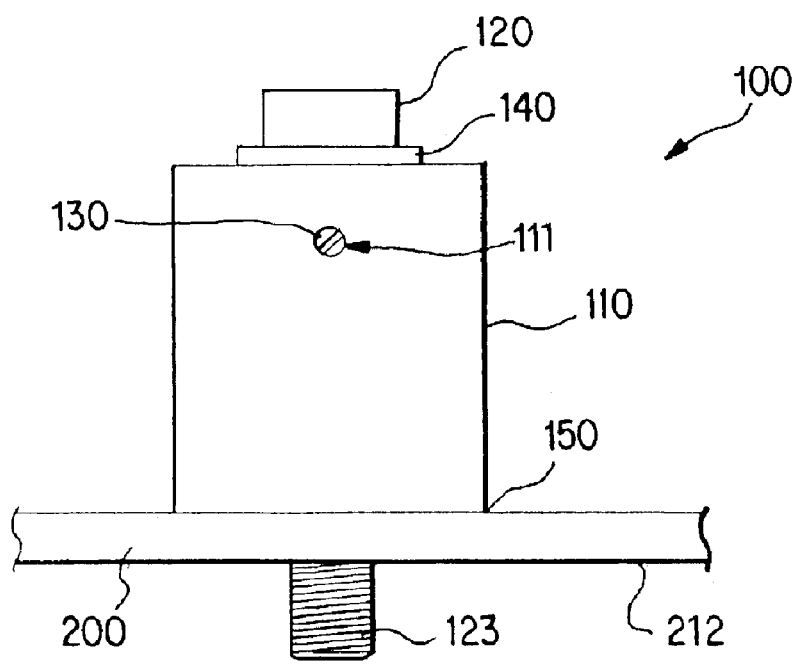
FIG. 2 is a side view of the embodiment of the fixture bolt assembly of FIG. 1 with the securement member in an extended second position.

FIG. 2 illustrates the fixture bolt assembly 100 with securement member 120 in a second position such that the lower-most end 123 of securement member 120 now extends below the lower-most surface 212 of fixture base 200. In this second position for securement member 120, as can be further seen in FIG. 3, lower-most end 123 of securement member 120 extends below the lower-most surface 212 of fixture base 200 in order to extend into an underlying machine plate 300. Securement member 120 is threaded into machine plate 300 to secure the fixture base 200 to the underlying machine plate 300 in order to perform a manufacturing process that requires rigid/secure mating between the fixture base 200 and the machine plate 300.

Thus, as described above, fixture bolt assembly 100 is fixedly mounted to fixture base 200 in order to retain securement member 120 on fixture base 200. Because securement member 120 is restrained against removal from fixture housing 110, as will be further explained later in this specification, securement member 120 is associated with fixture base 200 such that securement member 120 is readily available for securement of fixture base 200 to a machine plate. The association of securement member 120 with fixture base 200 allows an operator to secure the fixture base to the machine plate without requiring the operator to search for and locate appropriate securement members. Because the securement member 120 is always associated with fixture base 200 by use of fixture housing 110, the manufacturing process for mounting the fixture base to the machine plate is more efficiently performed.

Whereas FIGS. 1 and 2 only illustrate a single fixture bolt assembly 100 being associated with a fixture base, it can be understood that multiple fixture bolt assemblies can be associated with any particular fixture base depending upon the securement requirements of the fixture base with respect to a machine plate.

Figure 3:
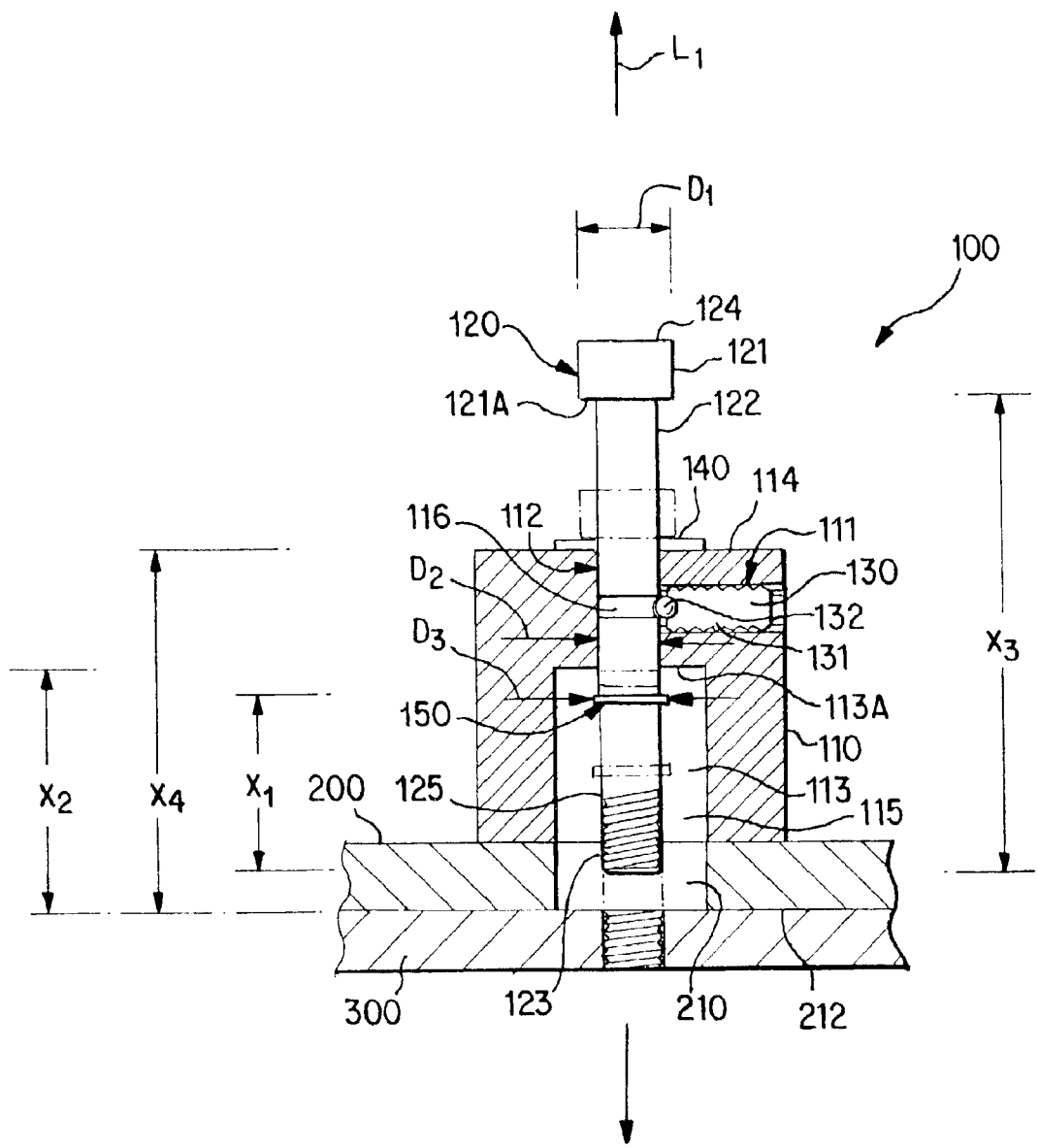
FIG. 3 is a cross-sectional view of the fixture bolt assembly and fixture base in association with a machine plate.

FIG. 3 further illustrates the fixture bolt assembly 100 of the present invention. As can be seen in FIG. 3, and as described previously, fixture bolt assembly 100 includes fixture housing 110. Fixture housing 110 may be cylindrical in shape and defines an aperture 111 that extends transversely to a longitudinal axis $L_1$ of the fixture housing 110. The fixture housing may be formed in other shapes, for example having a rectangular or square cross-section, thus, the present invention is not limited to any particular shape for the fixture housing. Aperture 111 may be a threaded bore that receives within it positioning member 130. As will be described further later in this specification, positioning member 130 includes a ball plunger 132 that retractably extends within a bore 112 defined by fixture housing 110. Ball plunger 132 is biased to extend into bore 112 such that it engages a groove 116 defined in shaft 122 of securement member 120 to retain securement member 120 in the first position where the lower-most end 123 of securement member 120 does not extend beyond the lower-most surface 212 of fixture base 200. As will also be further explained later in this specification, in order to move securement member 120 to the second position where the lower-most end 123 extends beyond the lower-most surface 212 of fixture base 200 in order to thread lower-most end 123 into machine plate 300, an operator must only apply sufficient force in a downward direction on securement member 120 to overcome the biasing force that provides for engagement of ball plunger 132 within groove 116. The force applied by the operator will retract ball plunger 132 from groove 116 as securement member 120 is moved downwardly to the second position.

As mentioned above, fixture housing 110 defines bore 112 through an upper portion of fixture housing 110. Shaft 122 of securement member 120 extends through bore 112 of fixture housing 110. Fixture housing 110 also defines a cavity 113. Cavity 113 is defined on a lower end of fixture housing 110, i.e., on an end of fixture housing 110 that mates with fixture base 200. As will also be further described later in this specification, cavity 113 is included in fixture housing 110 in order to provide for associating a retaining member 150 with a lower portion 125 of shaft 122. Retaining member 150 is disposed around shaft 122 within cavity 113 of fixture housing 110 such that securement member 120 is restrained against being upwardly removed from fixture housing 110 by engagement of retaining member 150 with the upper end 113A of cavity 113 when securement member 120 is moved to the first position. As can be understood, as securement member 120 is moved in an upward direction to the first position, securement member 120 is only able to be moved upward until retaining member 150 engages with upper end 113A of cavity 113. The engagement of retaining member 150 with upper end 113A prevents further upward movement of securement member 120 and, thus, prevents removal of securement member 120 from fixture housing 110. Since fixture housing 110 is fixedly associated with fixture base 200, securement member 120 is, therefore, also fixedly associated with fixture base 200.

As discussed previously, securement member 120 may be embodied as a bolt with threading on at least a lower end 123 thereof. As such, securement member 120 includes a head 121. Head 121 is included on a first end 124 of securement member 120 and, as described above, retaining member 150 is associated with the second end 125 of securement member 120. First end 124 of securement member 120 is disposed on a top side 114 of housing 110 and retaining member 150 is retained on the second end 125 of securement member 120 within cavity 113 on an underside 115 of fixture housing 110.

Head 121 of securement member 120 has a diameter $D_1$ that is larger than the diameter $D_2$ of bore 112 of fixture housing 110. Thus, head 121, and consequently securement member 120, is restrained from passing completely through fixture housing 110 when securement member 120 is moved to the second position by engagement of head 121 with washer 140 and the top side 114 of fixture housing 110. Securement member 120 is shown in the second position in phantom in FIG. 3.

As described previously, securement member 120 is also restrained against removal from fixture housing 110 when moved to the first position. In order to restrain securement member 120 from being removed from fixture housing 110, retaining member 150 has an outer diameter $D_3$ that is also larger than bore 112 diameter $D_2$ of fixture housing 110. Thus, as can be understood, as securement member 120 is moved upward, it can only be moved upward until retaining member 150 engages with upper end 113A of cavity 113.

In order to provide for both retraction of lower-most end 123 of securement member 120 within fixture base 200 and fixture housing 110 in the first position and for extension of lower-most end 123 of securement member 120 through a bore 210 defined by fixture base 200 for threading into a threaded bore of machine plate 300, certain dimensional relationships must be maintained. The distance $X_1$ between retaining member 150 and the lower-most end 123 of securement member 120 should be no greater than a distance defining the height $X_2$ of an extended cavity which is defined by cavity 113 of fixture housing 110 and the length of the bore 210 in the fixture base 200. As can be understood, if distance $X_1$ was greater than distance $X_2$, when securement member 120 was in the first position where retaining member 150 engages with upper end 113A of cavity 113, the lower-most end 123 of securement member 120 would extend beyond the lower-most surface 212 of fixture base 200.

Additionally, a distance $X_3$ between the lower-most end 121A of head 121 of securement member 120 and the lower-most end 123 of securement member 120 should be greater than a distance defining the height $X_4$ of the fixture housing 110 and fixture base 200, and washer 140, if used. As such, when securement member 120 is moved to the second position where head 121 engages with washer 140 and topside 114 of fixture housing 110, the length of shaft 122 is sufficient such that lower-most end 123 extends beyond the lower-most surface 212 of fixture base 200 such that it may be threaded into a bore defined by machine plate 300. It is desirable that at least four threads at lower-most end 123 of securement member 120 extend beyond lower-most surface 212 of fixture base 200 when securement member 120 is in the second position to allow for sufficient mating of securement member 120 with machine plate 300.

Although FIG. 3 illustrates a washer 140 as being utilized in the present invention, it is not required that a washer be used.

Figure 4:
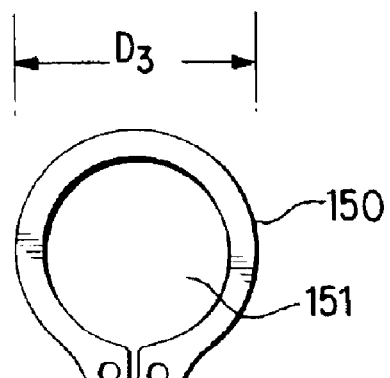
FIG. 4 is a top view of an embodiment of a retaining member in accordance with the principles of the present invention.

FIG. 4 illustrates an embodiment for retaining member 150. In this embodiment, retaining member 150 is a clip that is circular in form and defines an aperture 151 through it. As described previously, shaft 122 of securement member 120 is received within aperture 151. Retaining member 150 should be secured to securement member 120 with sufficient rigidity such that it is able to restrain securement member 120 from being removed from fixture housing 110, as described previously. Retaining member 150 may be comprised from a variety of materials, one of which being spring-steel in this embodiment. As was also described previously, retaining member 150 should have an outer diameter $D_3$ that is greater than the diameter $D_2$ of the bore 112 defined by fixture housing 110.

The embodiment for retaining member 150 as illustrated in FIG. 4 may be procured from a variety of manufacturers, including Rotor Clip. These "retaining rings", as they are named by Rotor Clip, are available from MSC Industrial Supply Company. However, other embodiments for a retaining member are contemplated. For example, it is not required that a retaining member be circular in form and extend completely around shaft 122 of securement member 120. Alternatively, a tab-like projection can be provided on shaft 122 to prevent securement member 120 from being removed from fixture housing 110. A single tab-like projection could be utilized or multiple tab-like projections could be utilized. The projections could be, for example, welded to shaft 122 or be adhesively secured to shaft 122. Additionally, the retaining member could be embodied as a pin that extends from a transverse bore defined by shaft 122 of securement member 120. Thus, any of a variety of different embodiments could be utilized for a retaining member in accordance with the principles of the present invention with the only requirement being that it be of sufficient structure and dimension to prevent securement member 120 from being removed from fixture housing 110.

Figure 5:
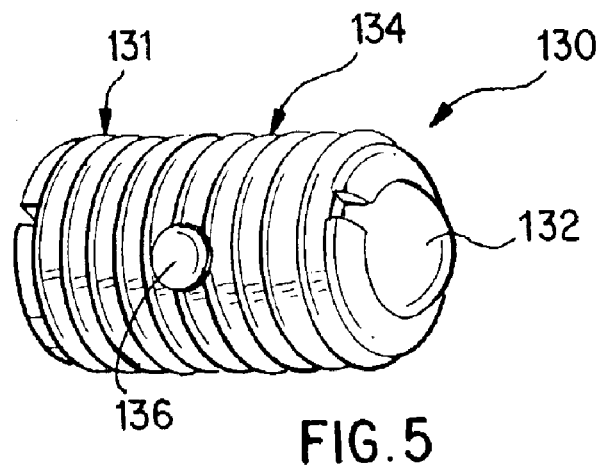
FIG. 5 is a perspective view of an embodiment of a positioning member in accordance with the principles of the present invention.
Figure 6:
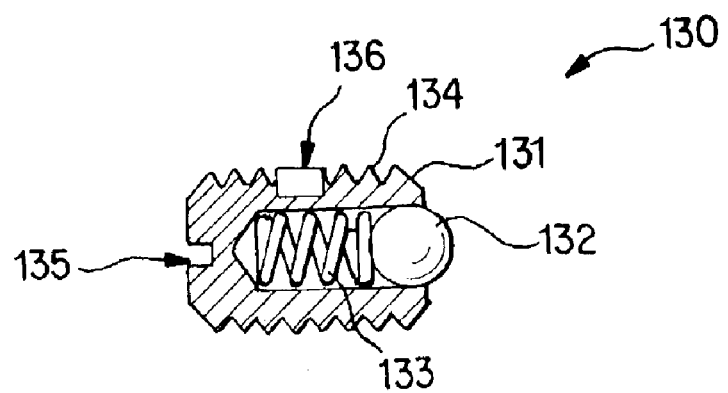
FIG. 6 is a cross-sectional view of the positioning member of FIG. 5.

FIGS. 5 and 6 illustrate an embodiment for positioning member 130 in accordance with the principles of the present invention. As can be seen, positioning member 130 includes a cylindrical body 131 and threading 134 on an external surface of body 131. External threading 134 provides for threading of positioning member 130 within aperture 111 defined by fixture housing 110. Slot 135, defined in an end of body 131 opposite ball plunger 132, allows for engagement of body 131 with a screwdriver in order to be able to thread positioning member 130 within aperture 111 of fixture housing 110. A locking element 136 may be provided within body 131 that is exposed on the outer surface of body 131 such that it may engage with a surface of fixture housing 110 that defines aperture 111 in order to secure positioning member 130 within aperture 111.

As described previously, positioning member 130 also includes ball plunger 132. As was also described previously, ball plunger 132 is biased into an outwardly-extending position from body 131 by spring 133. As such, ball plunger 132 extends within bore 112 defined by fixture housing 110 such that it engages with groove 116 in shaft 122 of securement member 120 to retain securement member 120 in the first position. In order to move securement member 120 to the second position, the operator merely needs to apply enough downward force to securement member 120 such that shaft 122 of securement member 120 engages with ball plunger 132 and overcomes the biasing force provided by spring 133. When the biasing force of spring 133 is overcome, ball plunger 132 is retracted within body 131 of positioning member 130 such that securement member 120 may be further moved to the second position. Thus, the provision of positioning member 130 is advantageous in that it retains securement member 120 in the first position. However, positioning member 130 is not required for practicing the present invention.

The embodiment of positioning member 130 illustrated in FIGS. 5 and 6 may be procured from a variety of different vendors, including TE-CO and Jergens. Ball plungers from these vendors are available from MSC Industrial Supply Company.

As described above, the present invention provides for fixedly associating a securement member 120 with a fixture base 200 by utilizing fixture housing 110. Fixture housing 110 is secured to fixture base 200 and securement member 120 is restrained against removal from fixture housing 110. Thus, the fixture bolt assembly 100 of the present invention can provide for efficiencies in the manufacturing process by providing a maintained association between a securement member and a fixture base where the securement member is utilized to secure the fixture base to a machine plate.

In accordance with a further feature of the present invention, a method of mounting a securement member on a fixture housing is provided. As was also previously described in discussing the apparatus of the present invention, the method includes the steps of disposing the securement member through the bore and the cavity defined by the fixture housing such that the head disposed on the first end of the securement member is positioned on the top side of the fixture housing. The retaining member is coupled on the second end of the securement member and disposed within the cavity on an underside of the fixture housing. As discussed previously, the fixture housing is fixedly attached to the fixture base, such as, for example, by welding.

The method may also include the step of movably disposing the positioning member within the aperture defined by the fixture housing where the positioning member is engageable with the securement member.

In a particular embodiment, a method of mounting a fixture on a machine plate is provided comprising the steps of fixedly attaching the fixture housing on the fixture where the fixture housing contains a securement member that is movably disposed within the fixture housing. The securement member is moved to a first position where the lower-most end of the securement member does not extend beyond the lower-most surface of the fixture. The fixture is then positioned on the machine plate and the securement member is moved to a second position where the lower-most end of the securement member extends through the bore defined by the fixture and beyond the lower-most surface of the fixture and into a bore defined by the machine plate.

The method may also further include the step of restraining the securement member against axial movement when the securement member is in the first position. The securement member may be restrained against axial movement when in the first position by engaging a groove defined by the securement member with a spring-loaded ball plunger disposed in the aperture defined by the fixture housing.

Additionally, the method may include the step of restraining the securement member from being removed from the fixture housing. A method of restraining the securement member from being removed from the fixture housing may include the step of engaging the retaining member with the surface of the fixture housing that defines the upper end of the cavity defined by the fixture housing.

The foregoing disclosure has been set forth merely to illustrate the invention and is not intended to be limiting. Since modifications of the disclosed embodiments incorporating the spirit and substance of the invention may occur to persons skilled in the art, the invention should be construed broadly to include everything within the scope of the appended claims and equivalents thereof.

What is claimed is:

1. A fixture bolt assembly, comprising:
    a fixture housing defining a bore therethrough and a cavity;
    a securement member disposed through said bore and said cavity and having a head on a first end of said securement member, said head disposed on a top side of said fixture housing; and
    a retaining member disposed proximal to a second end of said securement member and within said cavity of said fixture housing, said cavity disposed on an underside of said fixture housing;
    wherein said fixture housing further defines an aperture that intersects with said bore and further comprising a positioning member disposed within said aperture.

2. The fixture bolt assembly of claim 1 wherein said securement member head has a diameter and wherein said bore has a diameter and further wherein the securement member head diameter is greater than the bore diameter.

3. The fixture bolt assembly of claim 1 wherein said retaining member has a diameter and wherein said bore has a diameter and further wherein the retaining member diameter is greater than the bore diameter.

4. The fixture bolt assembly of claim 1 wherein said securement member defines a groove therein and wherein said positioning member is engageable with said groove.

5. The fixture bolt assembly of claim 4 wherein said fixture housing is fixedly attached to a fixture base and wherein when said positioning member is engaged in said groove, a lower-most end of said securement member does not extend beyond a lower-most surface of said fixture base.

6. The fixture bolt assembly of claim 1 wherein said positioning member is threaded into said aperture.

7. The fixture bolt assembly of claim 1 wherein said positioning member includes a spring-loaded ball plunger.

8. The fixture bolt assembly of claim 1 wherein said fixture housing is fixedly attached to a fixture base, said fixture base defining a bore aligned with said fixture housing bore and said fixture housing cavity.

9. The fixture bolt assembly of claim 8 wherein said securement member is movable between a first position and a second position through said fixture housing bore and said fixture base bore;
    wherein when said securement member is in said first position, said retaining member is engageable with a surface of said fixture housing that defines an upper end of said cavity and a lower-most end of said securement member does not extend below a lower-most surface of said fixture base; and
    wherein when said securement member is in said second position, said securement member head is engageable with a top-most surface of said fixture housing and said lower-most end of said securement member extends below said lower-most surface of said fixture base.

10. The fixture bolt assembly of claim 8 wherein said retaining member is spaced a first distance from a lower-most end of said securement member and wherein said first distance is no greater than a height of an extended cavity defined by said fixture housing cavity and said fixture base bore and wherein a lower-most end of said securement member head is spaced a second distance from said lower-most end of said securement member and wherein said second distance is greater than a height of said fixture housing and said fixture base.

11. The fixture bolt assembly of claim 1 wherein said securement member is a bolt with threading at a lower-most end thereof.

12. A method of mounting a fixture on a machine plate, comprising the steps of:
    fixedly attaching a fixture housing on said fixture, said fixture housing containing a securement member movably disposed within said fixture housing;
    moving said securement member to a first position wherein a lower-most end of said securement member does not extend beyond a lower-most surface of said fixture;
    positioning said fixture on said machine plate; and
    moving said securement member to a second position wherein said lower-most end of said securement member extends through a bore defined by said fixture and beyond said lower-most surface of said fixture and into a bore defined by said machine plate, and
    restraining said securement member against axial movement when said securement member is in said first position.

13. The method of claim 12 wherein said step of restraining said securement member against axial movement when said securement member is in said first position comprises the step of engaging a groove defined by said securement member with a spring-loaded ball plunger disposed in an aperture defined by said fixture housing, said aperture intersecting said bore.

14. A method of mounting a fixture on a machine plate, comprising the steps of:
    fixedly attaching a fixture housing on said fixture, said fixture housing containing a securement member movably disposed within said fixture housing;
    moving said securement member to a first position wherein a lower-most end of said securement member does not extend beyond a lower-most surface of said fixture;

positioning said fixture on said machine plate; and moving said securement member to a second position wherein said lower-most end of said securement member extends through a bore defined by said fixture and beyond said lower-most surface of said fixture and into a bore defined by said machine plate, and restraining said securement member from being removed from said fixture housing.

15. The method of claim 14 wherein a retaining member is disposed on a lower end of said securement member and within a cavity defined by said fixture housing and wherein said step of restraining said securement member from being removed from said fixture housing includes the step of engaging said retaining member with a surface of said fixture housing that defines an upper end of said cavity.

* * * * *